United States Patent [19]
Polos

[11] 3,782,238
[45] Jan. 1, 1974

[54] SELF-DRILLING TOGGLE BOLT ASSEMBLY

[76] Inventor: Constantine D. Polos, 1955 Cheshire Ln., Wheaton, Ill. 60187

[22] Filed: Mar. 2, 1972

[21] Appl. No.: 231,117

[52] U.S. Cl............................ 85/3 R, 85/68, 151/37
[51] Int. Cl............................................. F16b 35/04
[58] Field of Search..................... 85/3 R, 3 K, 3 S, 85/68

[56] References Cited
UNITED STATES PATENTS

| | | | |
|---|---|---|---|
| 231,334 | 8/1880 | Kraus | 85/3 R |
| 3,175,452 | 3/1965 | Leitmen | 85/3 R |
| 3,302,508 | 2/1967 | Topf | 85/3 R |
| 1,762,349 | 6/1930 | Phillips | 85/68 |

FOREIGN PATENTS OR APPLICATIONS

| | | | |
|---|---|---|---|
| 483,279 | 7/1953 | Italy | 85/3 K |
| 1,045,984 | 10/1966 | Great Britain | 85/3 R |

*Primary Examiner*—Edward C. Allen
*Attorney*—Charles J. Merriam et al.

[57] ABSTRACT

A self-drilling toggle bolt assembly comprises an elongated toggle head provided at one end with a cutting head used for drilling a hole through the surface on which the assembly is to be installed. The toggle head is equipped with a threaded hole intermediate its ends through which a bolt having a short threaded transverse member attached to its end is passed. Supported by the transverse member, the toggle head can be swung from a position parallel to the bolt to one in which the toggle head is perpendicular to the bolt. In use, the toggle bolt assembly, with the toggle head parallel to the bolt, is passed through a hole previously drilled in the mounting surface using the toggle head as a bit. The toggle head is then manipulated to a perpendicular position, permitting the threads of the bolt to engage the threaded opening of the head, thereby permitting the entire assembly to be drawn up tightly.

4 Claims, 7 Drawing Figures

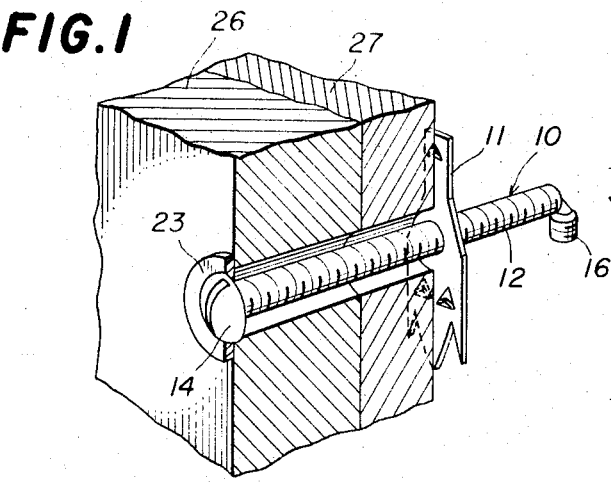
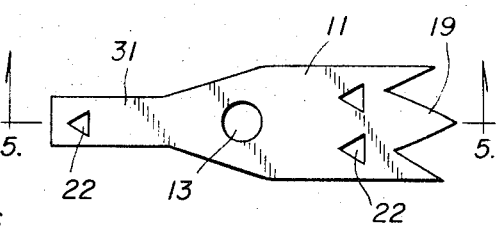
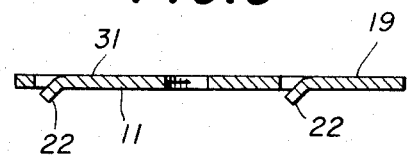
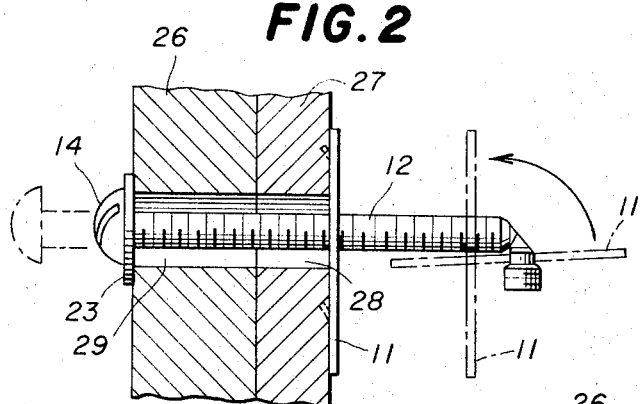
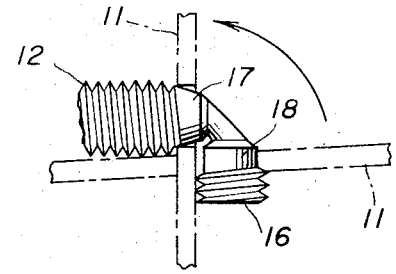
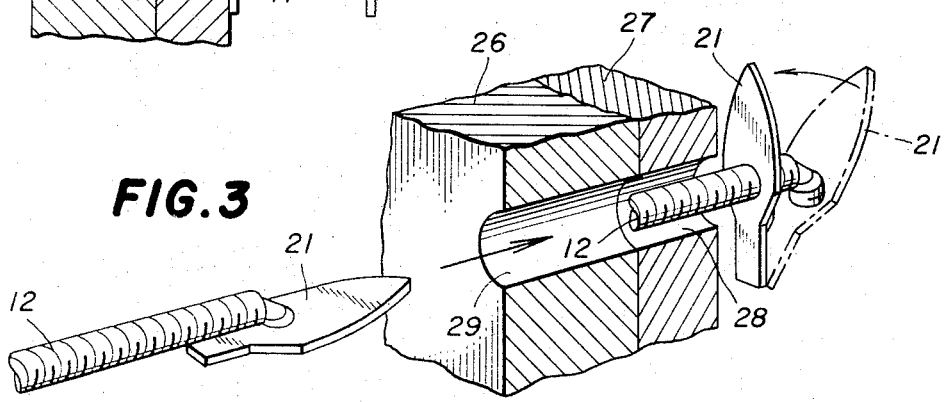
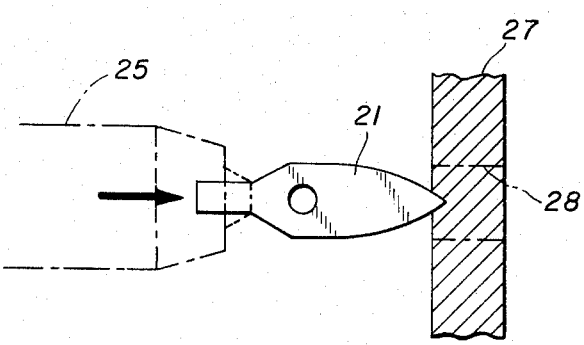

SELF-DRILLING TOGGLE BOLT ASSEMBLY

The present invention relates to a self-drilling toggle bolt assembly. More particularly, it relates to a toggle bolt assembly in which the toggle head is removable from the bolt and is used to drill the opening into which the toggle bolt assembly is to be installed, thereby eliminating the need for a separate drill bit and also providing a hole of the proper size for use of the particular toggle assembly.

Toggle bolts are generally used for attaching an object to a surface when access to the rear of the surface is restricted, as in the case of hollow walls and ceilings. A typical toggle bolt assembly consists of a threaded bolt on which is mounted a pair of spring-loaded wings which can be folded to a position adjacent the bolt, thereby permitting the entire assembly to be passed through a hole in the surface on which an attachment is to be made. After passing through the hole, the spring-loaded wings extend outwardly away from the bolt to a position parallel to the surface at approximately right angles to the bolt. The total length of the extended toggle head is greater than the hole through which the folded toggle head was inserted so that the toggle assembly cannot be pulled out of the hole. By rotating the bolt on which the toggle head is mounted, a firm attachment of a desired object, previously positioned between the toggle head and the end of the bolt, can be made.

The size of the hole into which a conventional spring-loaded toggle assembly is inserted for installation is fairly critical. On the one hand it must be large enough to permit the insertion of the folded toggle assembly therethrough, but at the same time it cannot be so large as to present an inadequate bearing surface for the extended toggle head. Accordingly, it is customary to specify for each size of toggle assembly the required opening which must be drilled, the size of which varies with the size of the toggle bolt assembly. In order therefore to install toggle bolts of different sizes, it is necessary to use different drill bits corresponding in size to each of the different sizes of toggle bolt.

In the improved toggle bolt assembly of the invention, the toggle head itself is used to drill the hole in the surface in which the bolt is to be installed. Accordingly, there is provided for any installation a drill bit of the correct size. In addition, the construction of the toggle assembly avoids the use of springs and articulated members which are not only expensive but prone to failure in use. The toggle head of the assembly is a solid, simple relatively flat member which is attached to the bolt in such a way that it can be positioned parallel to the axis thereof, permitting the entire bolt assembly to be inserted through the hole. Once the toggle head assembly has passed through the hole, it is swung to a different position permitting it to be engaged by the bolt and to be drawn up tightly against the interior surface to complete the installation.

The invention will be better understood from the following detailed description thereof, taken in conjunction with the accompanying drawings, in which:

FIG. 1 is an isometric view in partial section of a completed installation using one embodiment of the toggle bolt assembly of the invention;

FIG. 2 is an elevational view in partial section of the completed assembly of FIG. 1, also showing how the toggle head of the assembly is swung from one position to another;

FIG. 3 is an isometric view in partial section of another embodiment of the invention, using a toggle head of different configuration, showing how the toggle bolt assembly is inserted through a hole and how the toggle head is moved to complete the installation;

FIG. 4 is a plan view of a typical toggle head of the invention showing the form of cutting head which is used in the assembly of FIG. 1;

FIG. 5 is a sectional view along the line 5—5 of FIG. 4;

FIG. 6 is an enlarged detail of the end of a typical toggle assembly showing the construction of the transverse member; and FIG. 7 is a schematic representation of the use of the toggle head used in FIG. 3 as a drill bit for drilling the hole through which the assembly is to be inserted.

As shown in the drawings and particularly in FIGS. 1, 4, 5, and 6, a toggle bolt assembly 10 of the invention consists of two units, a flat elongated toggle head 11 having a thickness and length appropriate for its intended use and a bolt 12 which engages a threaded opening 13 in toggle head 11 intermediate the ends thereof. Bolt 12 is provided at one end with a conventional slotted head 14 and at its other end with a short transverse member 16 consisting of a short length of threaded bolt having the same diameter and thread size as the main body of bolt 12. Between the threaded portions of bolt 12 and transverse member 16 are two bands 17 and 18 of reduced diameter, one band (17) being adjacent to the main body of bolt 12 and one (18) adjacent to the transverse member, both of which fit loosely within the opening 13 of toggle head 11. By screwing transverse member 16 through the opening 13 of toggle head 11 a first position can be reached in which the toggle head 11 is supported in a horizontal position resting on the threads of the transverse member 16, as depicted in FIG. 6. Because of the loose engagement of band 18 with opening 13, the toggle head can be freely swung from the horizontal position shown to the vertical position also shown in FIG. 6 in which the toggle head is resting on band 17 at the end of bolt 12. With toggle head 11 in the vertical position shown in FIG. 6, it will be seen that the threads of bolt 12 are in position to start engagement with the threaded opening 13 in toggle head 11 by relative rotation thereof.

As shown in FIG. 4, toggle head 11 is provided at its one end with a cutting head 19. The configuration of this cutting head is not critical; it may assume the three-pointed version shown in the alternative embodiment 21 of FIG. 7. The relatively flat cutting heads shown in FIGS. 3 and 4 are suitable for drilling through relatively soft materials, such as plaster or wood. For use with harder materials, such as concrete. The cutting end of the toggle head can assume any shape which is satisfactory for its intended purpose, as will be apparent to those skilled in the art. The only requirement for the cutting head provided at the end of the toggle head is that it be appropriate for drilling a hole through the material in which the toggle bolt assembly is to be installed. The end of the toggle head opposite its cutting point (e.g., 31, FIG. 4) is necked down or otherwise adapted to be grasped in the chuck 25 of a drill, as shown schematically in FIG. 7. While not shown in the drawings, suitable adapters for holding the toggle head in the drill chuck while drilling through the surface can be used.

In FIGS. 1, 2, and 3 the toggle bolt assembly of the invention is shown as used to attach a section of board 26 to a wall 27. The following procedure is employed in making such an installation.

Using the toggle head (e.g., 11 or 21) as a drill bit, a hole 28 is drilled through wall 27 in the manner shown in FIG. 7, using a conventional drill or brace. Alternatively, in soft materials such as plaster, the hole can be made manually by holding the toggle head with a pair of pliers and rotating it back and forth against the surface. After the hole is drilled the toggle head is removed from the drill chuck 25 and is attached to the end of bolt 12 by screwing transverse member 16 into threaded hole 13 of the toggle head until the toggle head is disengaged from the threads of the transverse member and assumes a horizontal position as shown in FIG. 3. The toggle head and bolt are then passed through the hole 29 in board 26 (pre-existing or drilled by means of the toggle head) and hole 28 in wall 27, as shown in FIG. 3, with the toggle head in a horizontal position. After clearing the back of wall 27, the toggle head can be caused to change its position from horizontal to vertical, as shown in FIG. 6, by an appropriate manipulation of the bolt, as by shaking or tapping. With the toggle head now in a vertical position, engagement of the threads of bolts 12 with the toggle head can be made by rotating the bolt sharply to the left, imparting a similar rotation to the toggle head, which because of its inertia after rotation of the bolt ceases will become threadedly engaged with the threads of bolt 12. Once engagement between the threads of opening 11 and bolt 12 has started, the bolt can be withdrawn from the hole until the vertical toggle head comes into firm abutment with the inside of the wall 27. Gripping means on the inside face of the toggle head, such as lugs 22 stamped into the toggle head as shown in FIGS. 4 and 5, will aid in securing the toggle head against the interior surface of the wall. Completion of the assembly then requires only that the bolt 12 be turned in a conventional manner until it is drawn up tightly as shown in FIG. 2. A washer 23 under bolt head 14 may be used if necessary or desirable.

It will be seen that in addition to eliminating the necessity for auxiliary drill bits, the toggle bolt assembly of the invention is formed of sturdy easily made parts which are not likely to fail under stress. The holding power of the toggle bolt assembly of the invention has been found to be as much as four times that of the conventional spring-loaded wing-type of assembly, in corresponding sizes. Accordingly, the herein-disclosed toggle bolt assembly is less costly, stronger, more reliable and more convenient than heretofore known devices intended for the same use.

The foregoing detailed description has been given for clearness of understanding only, and no unnecessary limitations should be understood therefrom, as modifications will be obvious to those skilled in the art.

I claim:

1. A self-drilling toggle bolt assembly comprising a generally flat, elongated toggle head having one cutting end adapted for drilling a hole through a surface on which the bolt assembly is to be installed, said toggle head having a threaded opening intermediate its ends; a threaded bolt adapted to engage said threaded opening in said toggle head; a rigid transverse member attached to an end of said bolt, said transverse member comprising an outer threaded portion adapted to engage and pass through the threaded opening in said toggle head, and an inner unthreaded portion of reduced diameter adapted to enter said opening without engaging the threads thereof, said transverse member being adapted to support said toggle head in either of two positions, a first position generally parallel to said bolt, whereby said assembly can be passed through a hole of a size corresponding to that drilled by said toggle head when used as a drill bit, and a second position generally perpendicular to said bolt, whereby said bolt can be caused to engage said toggle head by rotation thereof.

2. The assembly of claim 1 in which one end of said toggle head is adapted to be held in a drill.

3. The assembly of claim 1 wherein said bolt is provided with a bolt head adapted for rotating said bolt.

4. The assembly of claim 1 wherein said toggle head is provided with gripping means for preventing rotation thereof by engagement with a surface in which said assembly is installed.

* * * * *